No. 883,597. PATENTED MAR. 31, 1908.
G. E., C. & R. J. WALLER.
COMBINED CORN HARVESTER AND SHOCKER.
APPLICATION FILED JUNE 30, 1906.
3 SHEETS—SHEET 3.
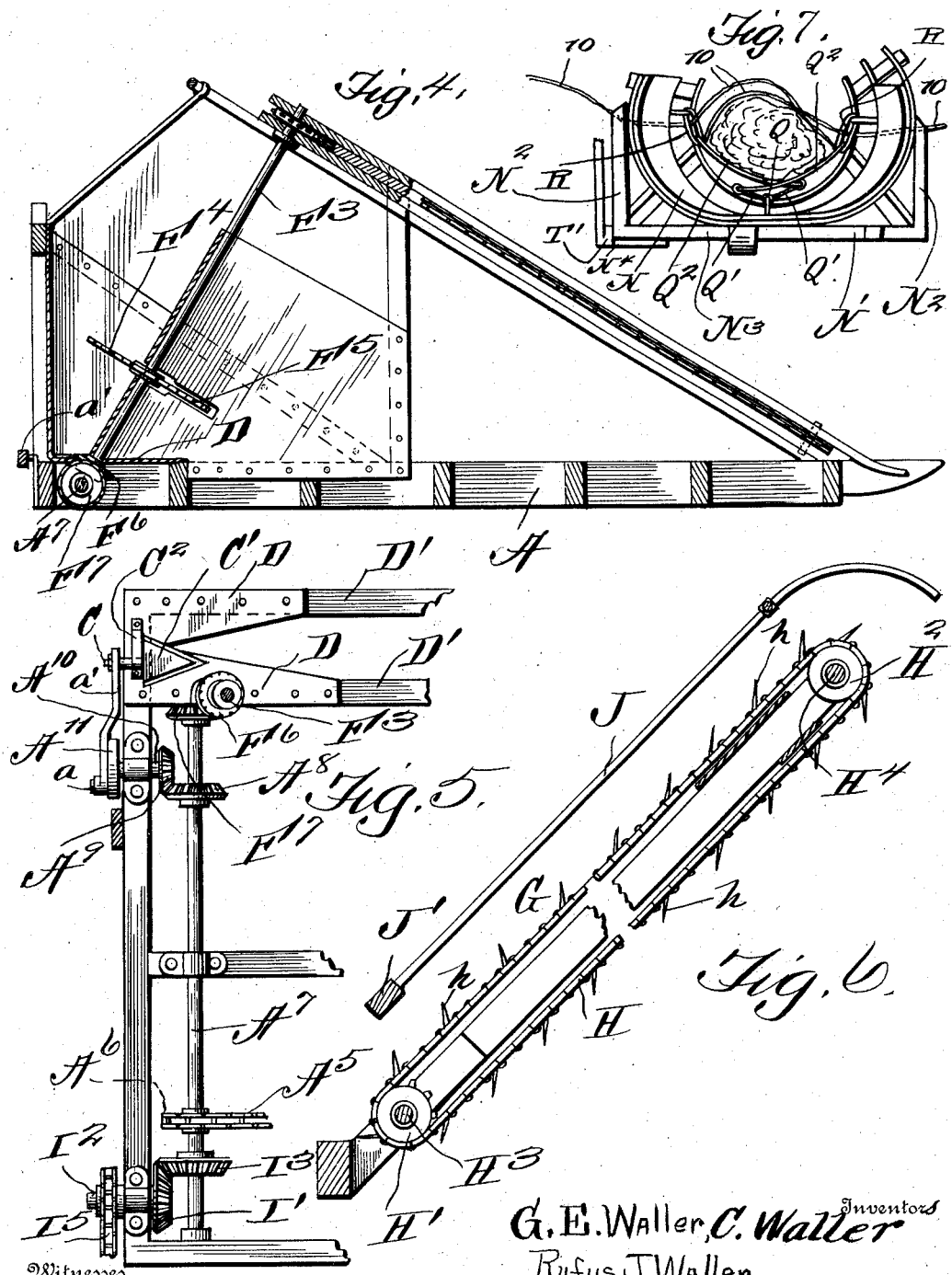

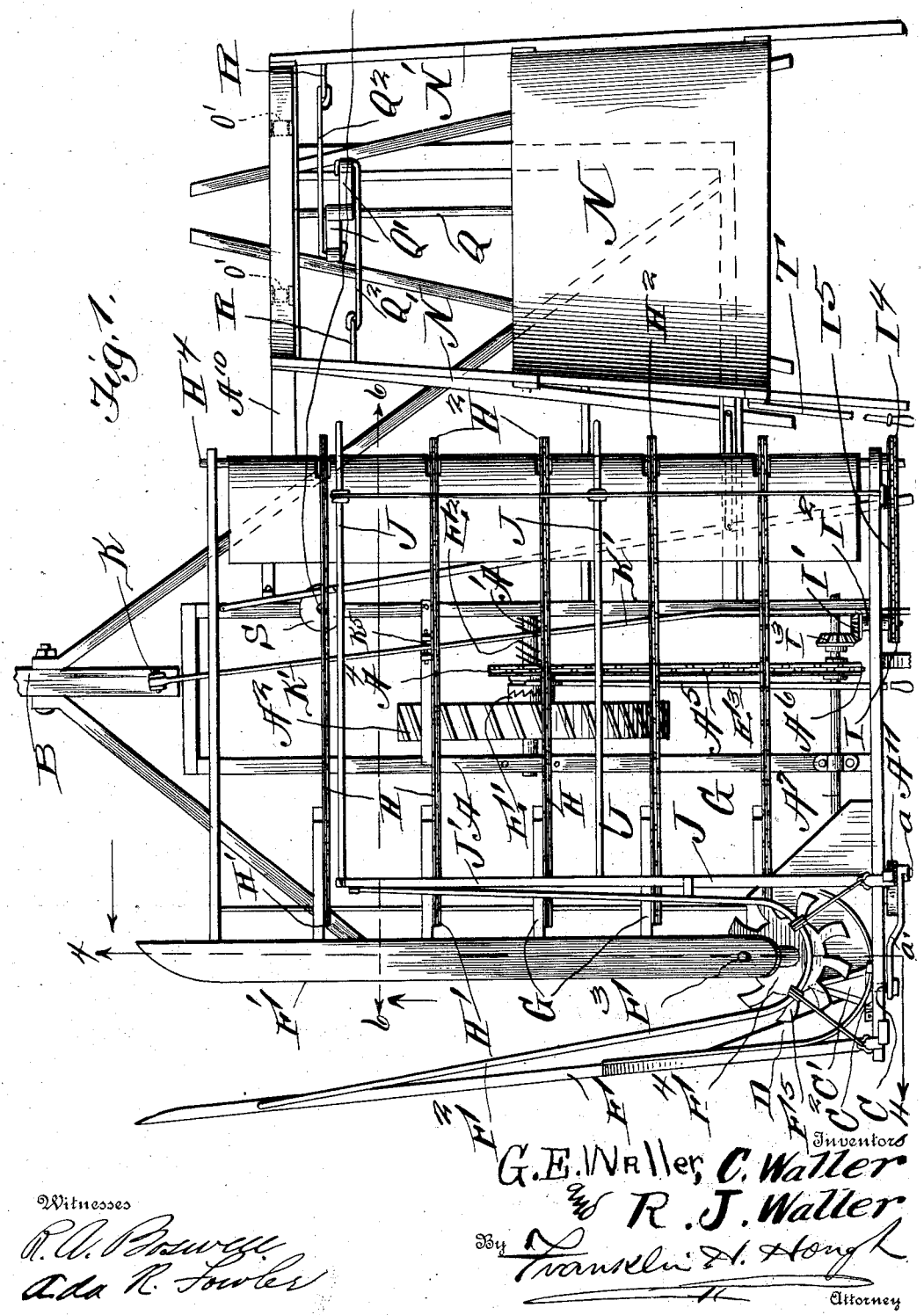

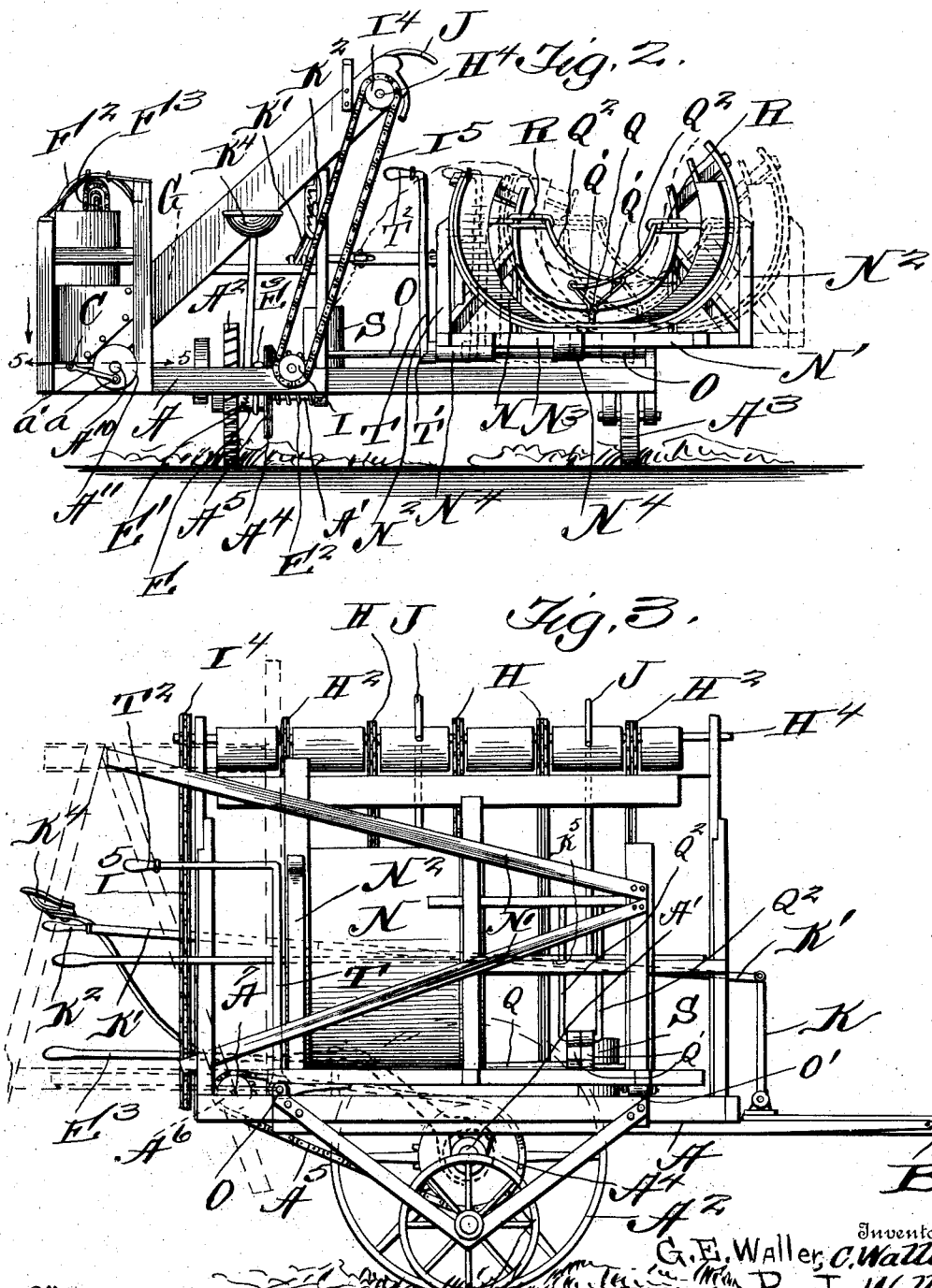

UNITED STATES PATENT OFFICE.

GROVER EARL WALLER, CHARLEY WALLER, AND RUFUS J. WALLER, OF HALLS SUMMIT, KANSAS.

COMBINED CORN HARVESTER AND SHOCKER.

No. 883,597.     Specification of Letters Patent.    Patented March 31, 1908.

Application filed June 30, 1906. Serial No. 324,269.

*To all whom it may concern:*

Be it known that we, GROVER E. WALLER, CHARLEY WALLER, and RUFUS J. WALLER, citizens of the United States, residing at Halls Summit, in the county of Coffey and State of Kansas, have invented certain new and useful Improvements in a Combined Corn Harvester and Shocker; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in combined corn harvesters and shockers, and the object of the invention is to produce a simple and efficient apparatus of this nature, and comprises various details of construction and combinations and arrangements of parts which will be hereinafter fully described and then specifically defined in the appended claims.

We illustrate our invention in the accompanying drawings, in which:—

Figure 1 is a top plan view of our apparatus. Fig. 2 is a rear elevation. Fig. 3 is a side elevation. Fig. 4 is a sectional view taken on line 4—4 of Fig 1. Fig. 5 is a sectional view taken on line 5—5 of Fig. 2, and Fig. 6 is a sectional view taken on line 6—6 of Fig. 1. Fig. 7 is a detail view showing the manner of supporting the shock.

Reference now being had to the details of the drawings by letter, A designates the platform of the apparatus in which is journaled an axle $A'$ having a driving wheel $A^2$ fixed thereto. A wheel $A^3$ is journaled under one end of the frame, and a tongue B is connected to the frame.

A sprocket wheel $A^4$, which is also fixed to rotate with the axle, has a chain $A^5$ passing about the same and over a sprocket wheel $A^6$, shown clearly in Fig. 5 of the drawings, which is fixed to the shaft $A^7$, which latter is journaled in suitable bearings in the frame of the apparatus. Power is transmitted through the shaft $A^7$ to the bevel gear $A^8$ rotating therewith, thence to the bevel gear $A^9$ mounted upon a stub shaft $A^{10}$ journaled in suitable bearings in the frame. A disk $A^{11}$ is fixed to said stub shaft and has an eccentrically mounted pin $a$ projecting therefrom, to which a pitman $a'$ is pivoted, the other end of said pitman being connected to the shank C of the reciprocating angled knife $C'$.

$C^2$ designates a strap forming a slot in which said shank C has a reciprocating movement.

D, D designate two angle plates which are fastened to the cross-pieces $D'$ of the frame, and between which the ears of corn come as the apparatus is driven over a field. The under face of the angled cutting knife $C'$ is adapted to reciprocate in contact with the upper surfaces of the plates D, D and to effect a shearing cut intermediate the opposite cutting edges of the knife and the inclined edges of said plates.

Referring to Figs. 1 and 2 of the drawings, will be seen a clutch E which is normally held in engagement with a clutch shell $E'$ by means of a spring $E^2$ mounted upon the axle, and a suitable clutch throwing lever $E^3$ is provided, whereby the apparatus may be thrown into or out of gear.

Referring to Fig. 1 of the drawings, will be seen an arm F which is spaced apart from the side $F'$ of the apparatus, and said arm is provided with a brace $F^2$ which securely holds the same at a slight inclination to the side $F'$, which space is provided to receive the rows of corn as the apparatus is driven over a field. At the rear end of said space near the lower end thereof, said cutting knife $C'$ is positioned, and $F^3$ is an inclined shaft mounted in the frame of the apparatus and having fixed thereto a disk wheel $F^4$ having a series of curved fingers $F^5$ projecting from the periphery thereof and adapted to throw the stalks of corn, after they are cut by said knife, upon the inclined frame G, see Fig. 6 of the drawings and top plan view Fig. 1. The shaft $F^3$ has a beveled pinion wheel $F^6$, fixed near the lower end thereof, which is in mesh with a beveled pinion $F^7$ fixed to the shaft $A^7$, whereby a rotary movement may be imparted to the wheel $F^4$. Said frame G, which is set at an angle of substantially forty-five degrees from a horizontal plane, has a series of endless conveyers H mounted thereon which pass about the sprocket wheels $H'$ and $H^2$, respectively, fixed to shafts $H^3$ and $H^4$ journaled near the bottom and top of said rack.

A beveled pinion wheel $I'$, shown clearly in Figs. 1, 2 and 5 of the drawings, is mounted upon a stub shaft $I^2$ journaled in bearings upon the frame of the apparatus, and is in mesh with a beveled pinion wheel I³ fixed to the shaft A⁷. A sprocket wheel I⁴ is fixed to the shaft H⁴, and a sprocket chain I⁵ passes about the sprocket wheel upon the shaft H⁴ and the sprocket wheel I. Fingers h are mounted upon the endless conveyers G, whereby the stalks of corn which fall upon the rack may be elevated. Guard rods J are fixed at their lower ends to the cross-piece J', and their upper ends are downwardly curved and extending over the upper ends of said frame G, are adapted to guide the stalks of corn as they approach the upper ends of the conveyers. Said rods serve to hold the corn from falling down from the conveyer and also when the corn approaches the upper end of the conveyer, serves to guide the same, whereby it may fall from the conveyer.

Pivotally connected to the link K, shown in Fig. 3 of the drawings, which link is fastened to the tongue, is a lever K' pivotally mounted on a pin K⁵ and having a handle K² positioned adjacent to the seat K⁴, said lever being provided for the purpose of tilting the apparatus by applying pressure to the handle N thereof, whereby the forward edge of the harvester may be tilted down to catch up any prostrate stalks of corn which may be lying upon the ground.

Projecting from one side of the harvester mechanism of our apparatus, is the shock receptacle N, shown clearly in Fig. 2 of the drawings, said shock receptacle being provided with a frame N' with standards N² which are fastened to the sides of the shock receptacle. The bottom strip N³ of said shock receptacle has hollow cylindrical bearing members N⁴ which are mounted to have a sliding movement upon the rod O which is fastened horizontally upon the extension portion of the frame of the apparatus. By this construction, it will be noted that the shock receptacle is adapted to tilt to a vertical position to dump a shock of corn, and when in readiness to receive stalks to form a shock, is held in the position shown in Fig. 2 of the drawings. The free end of the frame of the shock receptacle is provided with anti-friction rollers O', which, when the shock receptacle is in a horizontal position, are adapted to ride upon a cross-piece A¹⁰ of the extension frame. Said shock receptacle is adapted to have a horizontal movement, whereby the receptacle may be held underneath the overhanging end of the rack upon which the endless conveyers are mounted for the purpose of receiving the stalks of corn, and after the shock has been tied, said receptacle is moved horizontally so that it will clear the upper portion of the rack and be in readiness to be thrown into a vertical position for dumping the shock.

Pivotally connected to a centrally disposed rod Q, are the links Q', each of which is pivotally connected to a curved rod Q², each of which has an eye at its end connected to a link R, and which are provided for the purpose of drawing the stalks together to compress the shock. A string or cord carried by the twine box S, is adapted to be passed over the shock receptacle before the stalks are deposited therein, whereby, after the stalks have been compressed by said curved rods, the shock may be tied preparatory to its being dumped. A lever T, shown clearly in Figs. 2 and 3 of the drawings, has an eye T' adapted to receive the shaft O, and one end of said lever is bent at an angle and is disposed underneath the shock receptacle, and a handle T² is formed at the upper end of said lever, whereby, as the lever is tilted, the shock receptacle may be raised to a vertical position to stand the shock upon end as it is deposited from the apparatus.

The operation of our apparatus will be readily understood and is as follows. Power is transmitted to the cutting knife through the means described and the stalks of corn are severed and caught by the fingers of the rotating disk F⁴ and thrown horizontally upon the inclined conveyers, up which they are carried, and falling by gravity over the upper end of the rack, fall within the shock forming receptacle, the binding cord first being placed across the edges of the latter. When it is desired to compress the shock assuming the stalks to have fallen upon the curved rods, when the latter are in the positions shown in Fig. 7, the cords or ropes 10, which are fastened to the links R, are crossed above the shock, as shown in Fig. 7, and by pulling sufficiently upon the cords the curved rods may be made to assume the positions shown in Fig. 2 and, when the shock is held compressed by the rods Q² and the cords 10, the shock is in readiness to be tied by means of the cord from the twine box S, as will be readily understood. The shock receptacle may be moved horizontally by the operator taking hold of the rack holding the shock and moving the same so that it will clear the upper edge of the rack, after which the lever T is operated to cause the shock receptacle to be moved to a vertical position, which will deposit the shock standing in the field. This being accomplished, the shock receptacle is returned to its horizontal position and may be moved by taking hold of the handle T or any other part of the shock receptacle which may be conveniently reached underneath the overhanging end of the frame, and will thus be in readiness to receive the stalks for a new shock. In the event of there being low-lying or prostrate stalks, the apparatus may be tilted by the lever K which is connected to the tongue and pivoted on a pin K⁵ upon the frame and which lever, by pulling down upon the same will cause the forward end of the apparatus to be tilted down slightly as will be readily understood.

What we claim is:—

1. In combination with the frame of a corn harvester and shocker means for cutting and elevating the stalks, a laterally movable and tilting shock receptacle, links pivotally connected to the sides of said receptacle curved rods connected at their upper ends to the links upon the sides of the receptacle, and links upon the bottom of the receptacle to which the lower ends of the rods are connected, as set forth.

2. In combination with the frame of a corn harvester and shocker means for cutting and elevating the stalks, a laterally movable and tilting shock receptacle, links pivotally connected to the sides of said receptacle and other links connected to the bottom thereof, and curved arms each pivotally connecting the link upon the side and bottom of the receptacle at one side of the center thereof, as set forth.

In testimony whereof we hereunto affix our signatures in the presence of two witnesses.

GROVER EARL WALLER.
CHARLEY WALLER.
RUFUS J. WALLER.

Witnesses:
C. E. ANDERSON,
O. H. WOODT.